(12) United States Patent
Malik et al.

(10) Patent No.: US 7,451,184 B2
(45) Date of Patent: Nov. 11, 2008

(54) CHILD PROTECTION FROM HARMFUL EMAIL

(75) Inventors: Dale W. Malik, Dunwoody, GA (US); W. Todd Daniell, Marietta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 832 days.

(21) Appl. No.: 10/687,439

(22) Filed: Oct. 14, 2003

(65) Prior Publication Data

US 2005/0080889 A1    Apr. 14, 2005

(51) Int. Cl.
*G06F 13/00*    (2006.01)

(52) U.S. Cl. ............... 709/206; 709/219; 709/225; 719/329

(58) Field of Classification Search ............ 709/206, 709/219, 223, 224, 225, 229, 217; 719/328, 719/329
See application file for complete search history.

(56) References Cited

U.S. PATENT DOCUMENTS

| | | | |
|---|---|---|---|
| 5,944,787 A | 8/1999 | Zoken | |
| 5,999,932 A | 12/1999 | Paul | |
| 6,023,723 A | 2/2000 | McCormick | |
| 6,052,709 A | 4/2000 | Paul | |
| 6,161,130 A | 12/2000 | Horvitz et al. | |
| 6,192,360 B1 | 2/2001 | Dumais et al. | |
| 6,249,805 B1 | 6/2001 | Fleming, III | |
| 6,266,692 B1 | 7/2001 | Greenstein | |
| 6,321,267 B1 | 11/2001 | Donaldson | |
| 6,442,588 B1 | 8/2002 | Clark et al. | |
| 6,480,885 B1 | 11/2002 | Olivier | |
| 6,654,787 B1 | 11/2003 | Aronson et al. | |
| 6,654,800 B1 | 11/2003 | Rieger, III | |
| 6,708,205 B2 * | 3/2004 | Sheldon et al. | ............ 709/206 |
| 6,732,157 B1 | 5/2004 | Gordon et al. | |
| 6,748,403 B1 | 6/2004 | Lemke | |
| 6,757,740 B1 | 6/2004 | Parekh et al. | |
| 6,769,016 B2 | 7/2004 | Rothwell | |
| 6,779,021 B1 | 8/2004 | Bates | |
| 6,782,510 B1 | 8/2004 | Gross et al. | |
| 6,842,773 B1 | 1/2005 | Raiston et al. | |
| 6,854,014 B1 | 2/2005 | Amin et al. | |
| 6,941,466 B2 * | 9/2005 | Mastrianni | ............ 726/22 |

(Continued)

OTHER PUBLICATIONS

Malik; Final Rejection mailed Nov. 15, 2005; U.S. Appl. No. 10/005,641, filed Dec. 5, 2001.

(Continued)

*Primary Examiner*—Viet Vu
(74) *Attorney, Agent, or Firm*—Thomas, Kayden, Horstemeyer & Risley, LLP

(57) ABSTRACT

Embodiments, among others, of the present disclosure provide systems and methods for providing child protection in communication services. Briefly described, in architecture, some embodiments of the system, among others, can be implemented as follows. A user interface for a communications service is configured to provide an operation that is restricted from being performed by a user of a communication suite or persona of a child type. The communication suite has at least one communications account of the user for the communications service. Accordingly, logic is provided that determines if the user of a communication suite of the child type is attempting to perform the operation. Other systems and methods are provided.

18 Claims, 11 Drawing Sheets

U.S. PATENT DOCUMENTS

| | | | |
|---|---|---|---|
| 6,968,571 | B2 | 11/2005 | Devine et al. |
| 7,051,077 | B2 | 5/2006 | Lin |
| 7,155,484 | B2 | 12/2006 | Malik |
| 7,155,608 | B1 | 12/2006 | Malik |
| 2001/0054101 | A1 | 12/2001 | Wilson |
| 2002/0013692 | A1 | 1/2002 | Chandhok et al. |
| 2002/0049806 | A1* | 4/2002 | Gatz et al. .................. 709/203 |
| 2002/0059454 | A1 | 5/2002 | Barrett et al. |
| 2002/0065828 | A1 | 5/2002 | Goodspeed |
| 2002/0073233 | A1 | 6/2002 | Gross et al. |
| 2002/0107712 | A1 | 8/2002 | Lam et al. |
| 2002/0116641 | A1* | 8/2002 | Mastrianni .................. 713/201 |
| 2002/0199095 | A1 | 12/2002 | Bandini et al. |
| 2003/0144842 | A1 | 7/2003 | Addison et al. |
| 2003/0172020 | A1 | 9/2003 | Davies et al. |
| 2003/0172196 | A1 | 9/2003 | Hejlsberg et al. |
| 2003/0233418 | A1 | 12/2003 | Goldman |
| 2004/0015554 | A1 | 1/2004 | Wilson |
| 2004/0039786 | A1 | 2/2004 | Horvitz et al. |
| 2004/0054733 | A1 | 3/2004 | Weeks |
| 2004/0054741 | A1* | 3/2004 | Weatherby et al. .......... 709/206 |
| 2004/0064537 | A1 | 4/2004 | Anderson et al. |
| 2004/0073617 | A1 | 4/2004 | Milliken et al. |
| 2004/0088359 | A1 | 5/2004 | Simpson |
| 2004/0093384 | A1 | 5/2004 | Shipp |
| 2004/0117451 | A1 | 6/2004 | Chung |
| 2004/0167964 | A1 | 8/2004 | Rounthwaite et al. |
| 2004/0181581 | A1 | 9/2004 | Kosco |
| 2005/0022008 | A1 | 1/2005 | Goodman et al. |
| 2005/0050150 | A1 | 3/2005 | Dinkin |

OTHER PUBLICATIONS

Malik; Non-Final Rejection mailed May 5, 2006; U.S. Appl. No. 10/005,641, filed Dec. 5, 2001.
Malik; Notice of Allowance and Fees Due mailed Oct. 17, 2005; U.S. Appl. No. 10/005,641, filed Dec. 5, 2001.
"What is Spam?", Promote Responsible Net Commerce, Help Stamp out Spam, 1 page.
"Why is spam bad?", Promote Responsible Net Commerce, Stamp out spam, 2 pages.
"Spammers do more than spam", Promote Responsible Net Commerce: Help Stamp out spam, 2 pages.
"How does eMail Server Work?", Oracle eMail Server Understanding and Planning Guide, Release 5.1, 13 pages.
"Understanding E-mail Client", How E-mail Works, Marshall Brian's How Stuff Works, 2 pages.
"Understanding a Simple E-mail Server?", How E-mail works, Marshall Brian's How Stuff Works, 2 pages.
"Understanding SMTP", How E-Mail Works, Marshall Brian's How Stuff Works, 1 page.
"Understanding the POP3 Server?", How E-mail Works, Marshall Brian's How Stuff Works, 2 pages.
"Understanding the Real E-Mail System", How E-Mail Works, Marshall Brian's How Stuff Works, 3 pages.
"Understanding Attachments", How E-Mail Works, Marshall Brian's How Stuff Works, 2 pages.
"The Simplicity of E-mail", How E-mail Works, Marshall Brian's How Stuff Works, 1 page.
"E-mail Glossary", Everything E-mail, Internet Mail Services Network, Inc., Ipswich, MA, 3 pages.
"How Does Email Work?", Yale University Library Workstation Support Group, 4 pages.
"How Does Email Work?", IATS Computing Knowledge Base, University of Missouri, Columbia, 4 pages.
"What is an E-mail message", How E-mail works, Marshall Brian's How Stuff Works, 2 pages.
Graham: "A Plan for Spam", www.paulgrahm.com/spam.html; printed Jun. 23, 2003, pp. 1-13.
Graham; "Better Bayesian Filtering", www.paulgrahm.com/better. html, printed Jun. 26, 2003, pp. 1-11.
Shami; "A Bayesian Approach to Filtering Junk E-mail", Stanford University, Stanford, CA, pp. 1-8.
River; The MD5 Message-Digest Algorithm, Internet RFC 1321, Apr. 1992, pp. 1-21.
Malik; U.S. Appl. No. 11/466,948, filed Aug. 24, 2006.
Daniell; U.S. Appl. No. 11/685,656, filed Oct. 14, 2003.
Malik; U.S. Appl. No. 10/610,736, filed Jun. 30, 2003.
Daniell; U.S. Appl. No. 10/685,558, filed Oct. 14, 2003.
Malik; U.S. Appl. No. 10/609,164, filed Dec. 11, 2006.
Sheppard; U.S. Appl. No. 11/245,888, filed Oct. 7, 2005.
Daniell; U.S. Appl. No. 10/686,293, filed Oct. 14, 2003.
Daniell; U.S. Appl. No. 10/686,346, filed Oct. 14, 2003.
Malik; U.S. Appl. No. 10/005,641, filed Dec. 5, 2001.
Malik; Non- Final Rejection mailed Mar. 9, 2007; U.S. Appl. No. 11/466,948, filed Aug. 24, 2006.
Malik; Final Rejection mailed Sep. 26, 2007; U.S. Appl. No. 11/466,948, filed Aug. 24, 2006.
Daniell; Non- Final Rejection mailed Oct. 30, 2007; U.S. Appl. No. 10/685,656, filed Oct. 14, 2003.
Malik; Examiner Interview Summary Record mailed Dec. 21, 2007; U.S. Appl. No. 10/685,656, filed Oct. 14, 2003.
Malik; Non- Final Rejection mailed Nov. 12, 2004; U.S. Appl. No. 10/610,736, filed Jun. 30, 2003.
Malik;Examiner Interview Summary Record mailed Dec. 21, 2004; U.S. Appl. No. 10/610,736, filed Jun. 30, 2003.
Malik; Final Rejection mailed May 25, 2005; U.S. Appl. No. 10/610,736, filed Jun. 30, 2003.
Malik; Non- Final Rejection mailed Dec. 25, 2005; U.S. Appl. No. 10/610,736, filed Jun. 30, 2003.
Malik; Non- Final Rejection mailed Nov. 30, 2005; U.S. Appl. No. 10/610,736, filed Jun. 30, 2003.
Malik; Final Rejection mailed Apr. 11, 2006; U.S. Appl. No. 10/610,736, filed Jun. 30, 2003.
Malik; Examiner Interview Summary Record mailed Jun. 1, 2006; U.S. Appl. No. 10/610,736, filed Jun. 30, 2003.
Malik; Examiner Interview Summary Record mailed Jul. 6, 2006; U.S. Appl. No. 10/610,736, filed Jun. 30, 2003.
Malik; Notice of Allowance and Fees Due mailed Jul. 6, 2006; U.S. Appl. No. 10/610,736, filed Jun. 30, 2003.
Daniell; Non- Final Rejection mailed Jan. 2, 2008; U.S. Appl. No. 10/685,558, filed Oct. 14, 2003.
Daniell; Non- Final Rejection mailed Feb. 5, 2007; U.S. Appl. No. 10/686,283, filed Oct. 14, 2003.
Daniell; Examiner Interview Summary Record mailed Mar. 30, 2007; U.S. Appl. No. 10/686,293, filed Oct. 14, 2003.
Daniell; Final Rejection mailed Jul. 23, 2007; U.S. Appl. No. 10/686,293, filed Oct. 14, 2003.
Daniell; Non- Final Rejection mailed Dec. 5, 2007; U.S. Appl. No. 10/686,293, filed Oct. 14, 2003.
Daniell; Non- Final Rejection mailed Jan. 25, 2008; U.S. Appl. No. 10/686,293, filed Oct. 14, 2003.
Daniell; Non- Final Rejection mailed Mar. 22, 2007; U.S. Appl. No. 10/686,346, filed Oct. 14, 2003.
Daniell; Final Rejection mailed Dec. 12, 2007; U.S. Appl. No. 10/686,346, filed Oct. 14, 2003.
Malik; Non- Final Rejection mailed May 16, 2005; U.S. Appl. No. 10/005,641, filed Dec. 5, 2001.
UUencode and MIME FAQ; http://web.archive.org/web/20021217052047/http://userrs.rcn.com/wussery/attach.html. pp. 1 and 2; printed Oct. 19, 2007.
Malik; Non-Final Rejection mailed Nov. 25, 2005 for U.S. Appl. No. 10/610,736, filed Jun. 30, 2003.
Daniell; Final Rejection mailed Mar. 31, 2008 for U.S. Appl. No. 10/685,656, filed Oct. 14, 2003.
Daniell; Examiner Interview Summary Record mailed Apr. 7, 2008 for U.S. Appl. No. 10/686,293, filed Oct. 14, 2003.
Daniell; Final Rejection mailed May 22, 2008 for U.S. Appl. No. 10/686,293, filed Oct. 14, 2003.
Daniell; Pre-Brief Appeal Conference Decision mailed Apr. 8, 2008 for U.S. Appl. No. 10/686,346, filed Oct. 14, 2003.
Malik; Notice of Allowance and Fees Due mailed Mar. 27, 2008 for U.S. Appl. No. 11/466,948, filed Aug. 24, 2006.

Spamxpress; "spamxpress—anti-spam Rules/Filters for Outlook Express", Jun. 2, 2003, Web page retreived from The Internet Archive Wayback Machine, available at: http://web.archive.org/web/20030602073212/http://www.spamxpress.com/.

Williams; "Effective Spam Filtering with Eudora—The Filters", Aug. 6, 2003, Web page retreived from The Internet Archive Wayback Machine, available at: http://web.archive.org/web/20030806181316/http://www.cecilw.com/eudora/filters.htm.

Daniell; Final Rejection mailed Jul. 21, 2008 for U.S. Appl. No. 10/686,558, filed Oct. 14, 2003.

Daniell; Non-Final Rejection mailed Jul. 18, 2008 for U.S. Appl. No. 10/686,346, filed Oct. 14, 2003.

* cited by examiner

CHILD PROTECTION FROM HARMFUL EMAIL

CROSS-REFERENCE TO RELATED APPLICATION

This application is related to copending U.S. utility patent application entitled "Communication Suite Engine" filed on the same day as the present application and accorded Ser. No. 10/686,295, which is entirely incorporated herein by reference; U.S. utility patent application entitled "User Interface for a Communication Suite" filed on the same day as the present application and accorded Ser. No. 10/685,651, which is entirely incorporated herein by reference; and U.S. utility patent application entitled "Automated Instant Messaging State Control Based Upon Email Persona Utilization" filed on the same day as the present application and accorded Ser. No. 10/686,336, which is entirely incorporated herein by reference.

TECHNICAL FIELD

The present disclosure is generally related to digital communications and, more particularly, is related to the integration of digital communication technologies.

BACKGROUND

When a user establishes with an Internet service provider (ISP) an ISP-level account, that ISP often provides email access to the user. For example, ISPs often provide multiple email accounts (mailboxes) to a user as part of one ISP-level account so that the user may establish several email accounts for oneself or for his or her family members. Alternatively, the multiple email accounts permit a user to establish one email account for personal use while establishing another email account for business purposes. Usernames and passwords often distinguish between different accounts. Similarly, other types of communication accounts, such as various instant messaging accounts, may also be created as part of one or more ISP-level accounts. Accordingly, there is a need for an efficient and useful way to provide various channels of communications.

Thus, a heretofore unaddressed need exists in the industry to address the aforementioned deficiencies and inadequacies.

SUMMARY

Embodiments, among others, of the present disclosure includes systems and methods for providing child protection in communications services.

Briefly described, in architecture, embodiments of the system, among others, can be implemented as follows. A user interface for a communications service is configured to provide an operation that is restricted from being performed by a user of a communication suite or persona of a child type. Accordingly, logic is provided that determines if the user of a communication suite of the child type is attempting to perform the operation.

Embodiments, among others, of the present disclosure can also be viewed as providing methods for providing child protection in communication services. In this regard, embodiments of such methods, among others, can be broadly summarized by the following steps: creating a child persona having at least one communications account for a communications service associated with the child persona; and restricting a first operation from being performed by a user who is accessing the at least one communications account of the child persona.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
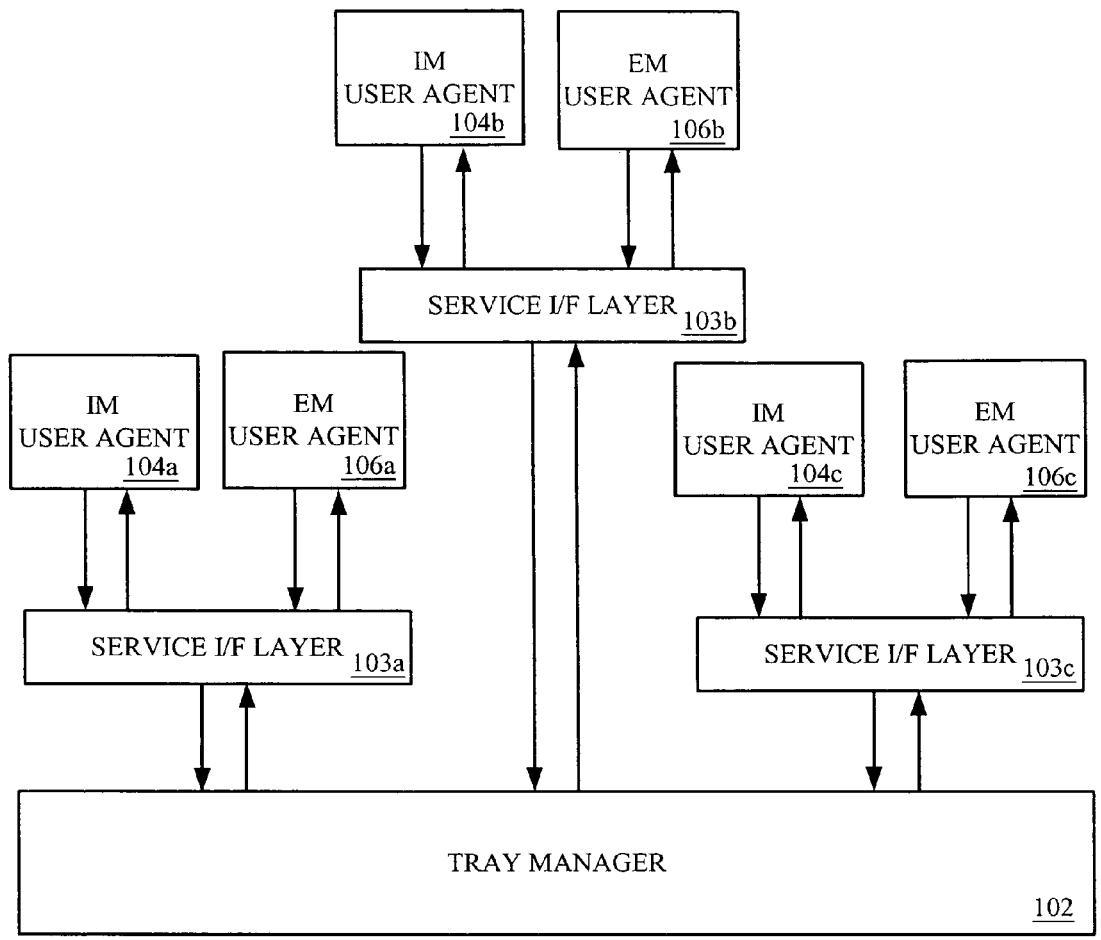
FIG. 1 is a block diagram of one embodiment of component architecture for integrating the functionality of instant messaging and email according to the present disclosure.

Reference is now made in detail to the description of the embodiments as illustrated in the drawings. While several embodiments are described in connection with these drawings, there is no intent to limit to the embodiment or embodiments disclosed herein. On the contrary, the intent is to cover all alternatives, modifications, and equivalents. Additionally, while the following description and accompanying drawings specifically describe integration of instant messaging (IM) and email, it will be clear to one of ordinary skill in the art that the systems and methods presented herein may be extended to integrating other channels of communication such as Internet call waiting (ICW), video conferencing, etc.

FIG. 1 is a block diagram showing one embodiment of component architecture for integrating the functionality of instant messaging (IM) and email. As shown in FIG. 1, one embodiment of a system for integrating IM and email comprises a tray manager 102, and multiple service interface layers 103a-103c. Further, an IM user agent 104a-104c and an email (EM) user agent 106a-16c may also communicate and be coupled with the service interface layer 103a-103c. The IM user agent 104a-104c and the email (EM) user agent 106a-106c typically provide communication services that a user has requested and installed. Accordingly, other communication services may also be provided by other objects or agents.

In sample embodiments, the various components 102, 103a-103c, 104a-104c, and 106a-106c may be seen as software modules, which are launched by a user on a general-purpose personal computer (not shown) or other programmable device (not shown). In other embodiments, the various components 102, 103a-103c, 104a-104c, and 106a-106c may be seen as software objects in a distributed network (not shown), which are instantiated and destroyed by appropriate software commands. Since instantiation and destruction of objects in distributed networks is well known, further discussion of object instantiation and destruction is omitted.

In some embodiments, the various components 102, 103a-103c, 104a-104c, and 106a-106c of FIG. 1 are software modules on a personal computer (not shown) utilized by one or more users. In this regard, the software modules are installed on the personal computer (or other computing device) and, thereafter, are launched by a user. During installation of the software modules, all of the login names and passwords for each user of the personal computer may be requested for each user's email accounts (e.g., mailboxes) and IM accounts. Further, a user may be prompted to organize email and/or IM accounts according to one or more personas. The integration of multiple mailboxes having multiple email accounts is described in detail in U.S. patent application Ser. No. 10/326, 249, which is incorporated herein by reference as if set forth in its entirety.

For example, a user may have a first email account, a second email account, and a third email account. Further, the user may have a first IM account. Accordingly, the user may create a first persona and associate the first email account, second email account, and the first IM account with the first persona. Also, the user may create a second persona and associate the third email account with the second persona. In this way, a user may log into a personal computer (or some other computing device or personal communications device) as a particular persona which makes himself or herself available to immediately receive communication for the communication services and/or accounts associated with the particular persona (that may also be referred to as a particular communication suite).

Moreover, a different user may also create a different persona for use on the same personal computer or communications device. Accordingly, the different user when logged into the different persona may access different communication accounts than another user who is not logged into or is prevented from logging into the different persona.

Accordingly, for each persona (or suite) that a user creates, the user of that persona may be able to specify different preferences and features for that particular persona. The login names, passwords, and preferences for the respective personas may be stored in a local database (not shown) for subsequent use by the software modules. For example, a user may specify a persona type or class (e.g., child or adult), provide security measures, and customize other options associated with the persona. In addition, a primary user of the personal computer (referred to herein as an administrator) may control the creation of personas by activating password protection that has to be satisfied before a persona may be created.

Upon installation of the software modules onto the personal computer (not shown), a user may launch the tray manager 102. The tray manager 102 generates commands to launch a service interface layer 103a-103c for each persona that has been created by a respective user with regard to communication services, such as email service. Typically, each persona may be associated with a message retention area (e.g., a mailbox) where designated messages for that persona are transferred. For example, a user may create a "business" persona so that electronic correspondence that is addressed to the user's business email address(es) is delivered to the message retention area of his or her "business" persona. Accordingly, the user may then create a "casual" persona to receive non-business type mail, such as correspondence from friends and family. Further, in the case where the user allows other people, such as family members, to use his or her email service, different personas may be created for each family member. Each persona (or suite) that is created is directly associated with a service interface layer 103a-130c via a unique identifier that identifies the persona and service interface layer 103a-103c. In this unique way, a user may organize and encapsulate communication services based upon a user's persona.

Each service interface layer 103a-103c may generate commands to launch the IM user agent 104a-104c and/or the email (EM) user agent 106a-106c as background processes for each user. In response to the generated commands, the various components 104a-104c, 106a-106c are launched as background processes. Other objects that provide communication services, such as an address book object (not shown), Internet call waiting service, video conferencing, etc. could also be launched by the service interface layer 103a-103c if each has been installed on the personal computer. For example, the IM user agent 104a-104c and the email (EM) user agent 106a-106c may be configured to communicate with an address book object. The address book object may also be coupled to an address book database (not shown) so that information may be stored to the address book database by the address book object or retrieved from the address book database by the address book object. Information stored in the address book database may include, for example, names and email addresses of a user's email contacts, names and IM addresses of the user's IM contacts, phone numbers for the various email and IM contacts, mailing addresses for the various email and IM contacts, business addresses for the various email and IM contacts, etc. The integration of an address book object with IM and email services is described in detail in U.S. patent application Ser. No. 10/325,317, which is incorporated herein by reference as if set forth in its entirety.

In another embodiment, the various components 102, 103a-103c, 104a-104c, and 106a-106c of FIG. 1 are objects in a distributed network (not shown). In this regard, subsequent to installation of the software modules, when a user launches the tray manager 102, the tray manager 102 instantiates the service interface layers 103a-103c for each persona that has been created. Each service interface layer 103a-103c may then instantiate the IM user agent 104a-104c and the email user agent 106a-106c (and any other objects that provide communication services and has been associated with the relevant persona) and runs these objects on the client system (not shown) as background processes. Other objects may also be instantiated by a service interface layer 103a-103c such as an address book object or other user agents, such as a user agent for an Internet call waiting service or a video conferencing service that has been installed on the personal computer or communications device. For example, an address book object (not shown) may be coupled to an address book database (not shown) so that information may be stored to the address book database by the address book object or retrieved from the address book database by the address book object. The IM user agent 104a-104c and the email user agent 106a-106c may also communicate with the address book object, thereby using the address book object as an interface between the IM user agent 104a-104c and the email user agent 106a-106c.

As described above, the various instantiated components 103a-103c, 104a-104c, and 106a-106c provide a mechanism by which integration between the IM system and the email system is achieved.

Figure 2:
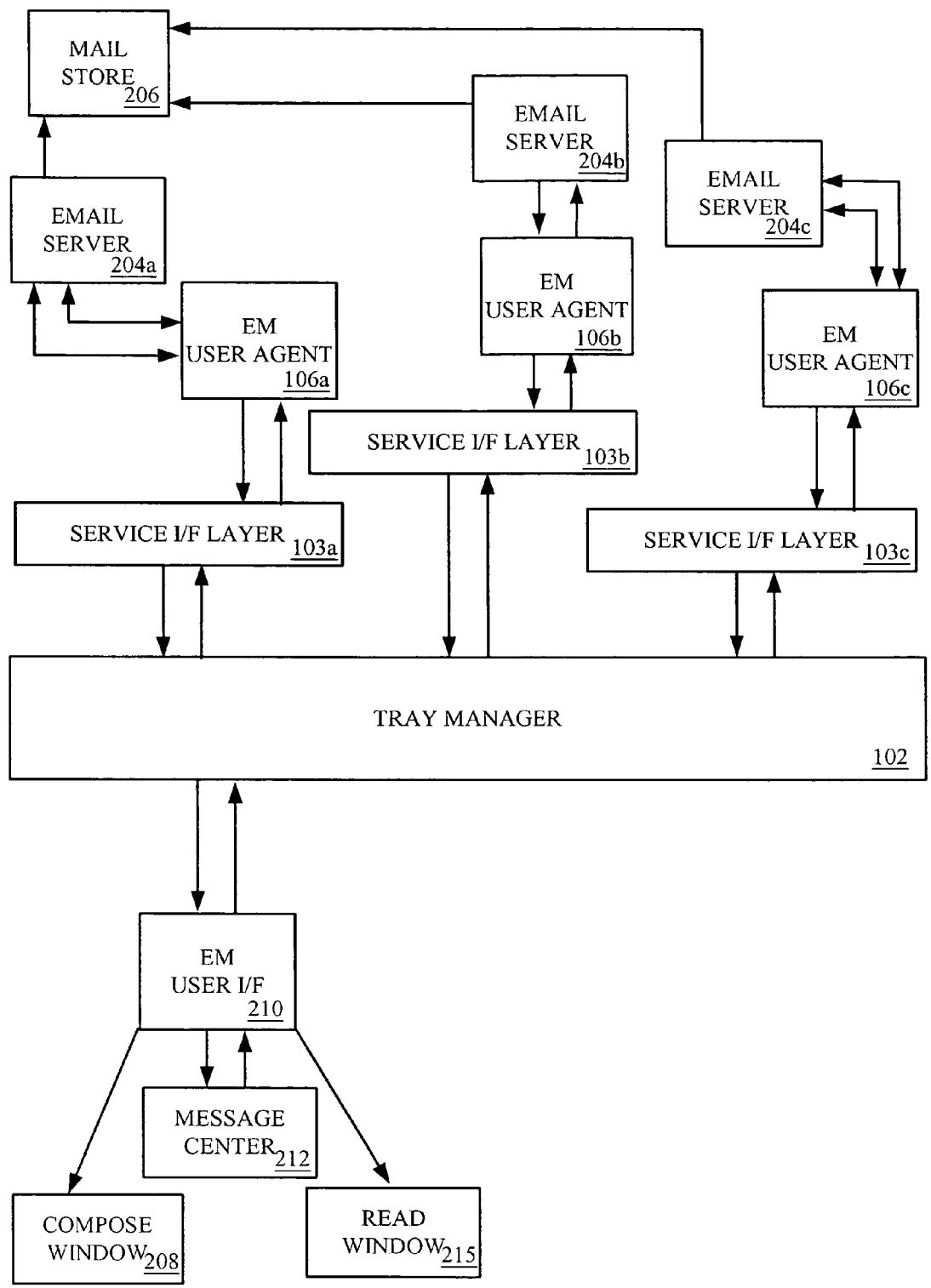
FIG. 2 is a block diagram of one embodiment of the component architecture of FIG. 1 when a user selects an email user interface.
Figure 4:
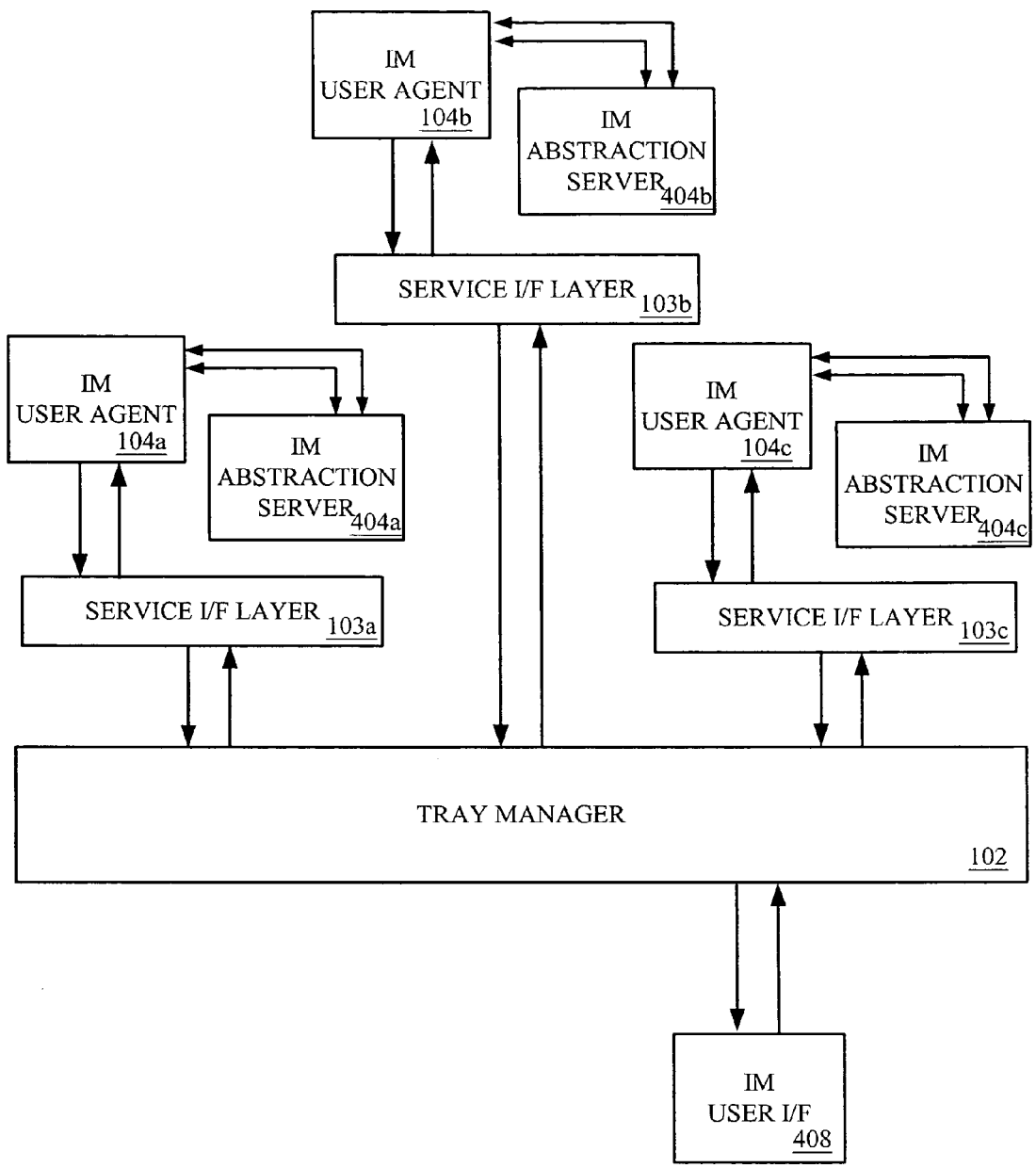
FIG. 4 is a block diagram of one embodiment of the component architecture of FIG. 1 when the user selects an IM user interface.

Regardless of whether the various components 103a-103c, 104a-104c, and 106a-106c are launched as software modules or instantiated as distributed objects, once the various components 103a-103c, 104a-104c, and 106a-106c are running as background processes, the tray manager 102 launches a user interface, based upon the user's selection of either an IM interface (not shown in FIG. 1) or an email interface (not shown in FIG. 1) or both. FIG. 2 is a block diagram showing component architecture associated with the user selecting the email interface (not shown in FIG. 1), while FIG. 4 is a block diagram showing component architecture associated with the user selecting the IM interface (not shown in FIG. 1).

The tray manager 102 is configured to track user activity and to regulate the level of communications that occur between the service interface layers 103a-103c and associated communication service components, such a the IM or email user agents 104a-104c, 106a-106c. In this regard, the tray manager 102 is notified as to which persona (or suite) of a user is currently active on the personal computer. The process of identifying an active persona or suite is described hereinafter.

For example, if a user is using a personal computer and in particular is checking for email messages (via an email user interface) that may have been received on the email accounts that are associated with a first persona, then the first persona is "active" on the personal computer. If the user, however, switches (e.g., clicks on another opened window) to an IM user interface to chat via an IM account associated with a second persona, then the second persona is now active and the first persona becomes inactive. In other words, the persona associated with a graphical user interface (GUI) control that is currently "in focus" is an active persona. Notice, one persona is primarily active at a time, preferably. Although, it is possible for no personas to be currently active. For example, an active persona may become inactive due to lack of user activity or due to a specific user command directed at a user interface.

Thus, the tray manager 102 notifies each service interface layer as to whether the service interface layer's associated persona is currently active on the personal computer or whether the service interface layer's associated persona is inactive. The active or inactive state of service determines how a service interface layer 103a-103c communicates with the tray manager 102. For example, if an email message is received for an email account associated with a particular persona that is not currently in use on a personal computer, than a notification as to the receipt of that message may be delayed until a user is on the personal computer who has logged into that email account and assumed the particular persona.

Accordingly, the service interface layer for the active persona is directed by the tray manager 102c to communicate directly to the user interface that is under control of the user who has assumed the active persona. A service interface layer that is inactive, however, suppresses communication with the user interface under the control of an active persona, since the active persona is not associated with this particular service interface layer that is inactive. Correspondingly, the inactive service interface layer may inform communication services via associated user agents 104a-104c, 106a-106c that the services should be in an inactive state. For example, an inactive service interface layer may direct an IM user agent to assume an inactive presence state such as online-away. Correspondingly, an inactive service interface layer may direct an email (EM) user agent to go into "sleep mode" for an inactive persona.

In a general sense, the tray manager 102 receives information as to which persona is in control of the personal computer, for example, and informs each service interface layer 103a-103c as to whether the service interface layer is currently active or inactive. Based on whether it is active or inactive, the service interface layer 103a-103c may suppress communication with a user interface. For example, the service interface layer 103a-103c may direct a communications user agent 104a-104c, 106a-106c to go into an inactive state of service, or the service interface layer 103a-103c may prohibit communication (e.g., a report on user keyboard activity) from a user interface to be transmitted to a communications user agent 104a-104c.

For instance, in the windows environment, a particular window or control that is "in focus" or currently being used within the email user interface may notify the tray manager 102 that a particular persona (that is associated with the particular window, e.g, a message retention area for a particular persona) is currently active. For example, the main window within a GUI environment of the email user interface or IM user interface may be triggered to communicate with the tray manager upon a wm_setfocus message being generated for the main window. After receiving the wm_setfocus message, the main window (within the email user interface) may determine which sub-window caused the wm_setfocus message to be generated and therefore may determine which persona (that is associated with the sub-window) is currently active. After the determination is made, the applicable user interface may provide the identity of the active persona to the tray manager 102. The tray manager may then "activate" the particular service interface layer associated with the active persona by notifying the service interface layer that its persona is currently active. Correspondingly, the tray manager also "deactivates" the service interface layers of inactive personas by notifying each of these service interface layers that its persona is currently inactive. Therefore, a deactivated service interface layer may inform its associated communication services that their associated persona is currently inactive on the personal computer or communications device, although there may be a user currently operating the computer or device.

To illustrate, consider an instant messaging communication service. Generally, the availability of a user of an instant messaging service can be determined through presence information. Typically, in an IM system, each time a user logs onto the system, a server, such as an IM server, receives an initial set of presence indicators from a client processing device, such as online-available, online-busy, offline, etc. Presence can change by user input or lack of activity at a client processing device. For example, a user may change presence from online-available to online-away, among other presence types. The IM server periodically queries the client processing device for presence information. The IM server notes the change in presence and an event change indication will be sent from the IM server to any associated client processing devices. Other client processing devices connected to the system may also receive the event change notification. Presence can also change when no activity such as keystroke or mouse movement from the client processing device occurs over a designated time period. For example, if a user does not utilize the keyboard for a 30 minute duration, the status of the client processing device may change from online-available to online-away state. However, with multiple users of a computer system, keyboard or mouse activity does not indicate if a particular user is present on the computer system. Further, keyboard or mouse activity does not indicate if a particular user is willing to receive one type of communication associated with one persona and not willing to receive another type of communication associated with a different persona. However, the various instantiated components 103a-103c, 104a-104c, and 106a-106c, as described above, provide a mechanism by which integration between the IM system and the email system is achieved with regard to multiple users and communication personas. Specifically, the various instantiated components 103a-103c, 104a-104c, and 106a-106c, as described above, provide a mechanism by which the activity or availability level of a persona may be determined.

Therefore, if a first persona is in current use (and thus active) of a personal computer, then the IM user agent of a second persona (which is inactive) may indicate that presence state of the second persona is online-away. Correspondingly, the EM user agent of the second persona may go into a "sleep mode" so that the EM user agent of the second persona may poll an email server at a slower rate than if the EM user agent was not in a "sleep mode." Further, if a user agent for an incoming calling waiting service was instantiated for the second persona, then an indication of incoming calls for the second persona may be suppressed while the second persona is inactive.

FIG. 2 is a block diagram showing one embodiment 200 of component architecture related to email services when the user selects an email user interface 210 and more particularly, when the user is associated with a particular persona (or suite) with regard to the email user interface 210. As described above, the tray manager 102 may query the user for the selection of the IM or email interface or both. If the user selects the email interface, then the tray manager 102 receives the selection of the email user interface 210 and retrieves the login names and passwords for each persona that has been created in regard to the email service, which were previously stored during creation of the personas, from the local database (not shown). In this way, email messages for a mailbox of an inactive persona may be retrieved when another persona is active; although, in other embodiments, the login names and passwords of the active persona may be singularly retrieved. The email login names and passwords of each persona are conveyed to the respective email user agent 106a-106c via the respective service interface layer 103a-103c, which receives the login names and passwords.

Upon receiving the login names and passwords of a respective persona's email accounts, the respective email user agent 106a-106c logs into each of the respective persona's email accounts at the various email servers 204a-204c using the respective login names and passwords. Upon logging into each of the respective persona's email accounts, the email user agent 106a-106c associated with the particular persona retrieves all of the email messages stored on the email accounts of the respective persona and stores them at a local mail store 206 for the respective persona. In an example embodiment, the respective persona's email accounts are simple mail transfer protocol (SMTP) email accounts. Additionally, the respective persona's email accounts may be post office protocol version 3 (POP3) compatible.

The mail store 206 of FIG. 2, unlike prior systems, may comprise email messages from various email accounts (e.g., AOL, MSN, YAHOO) that maybe categorized and associated with a particular persona (or suite), which are accessible through a single consolidated mail store 206. This permits the respective persona to access a common grouping of emails from email accounts that have been associated with the persona.

Upon retrieving multiple email messages from multiple email accounts associated with a respective persona and storing them at the mail store 206, the email user agent 106a-106c generates a command to the tray manager 102 to launch or instantiate an email user interface 210 to display the retrieved email messages of an active persona to a user. As shown in FIG. 2, upon receiving the command to launch or instantiate the email user interface 210, the tray manager 102 instantiates the email user interface 210, which, in turn, instantiates a message center 212 for displaying the retrieved email messages. Note, the message center 212 may be instantiated with a pointer to the mail store 206, thereby permitting direct retrieval of the email messages from the mail store 206 by the message center 212. Thus, at this point, all of the email messages from all of the email accounts associated with the active persona are available to an authorized user at the message center 212.

Figure 3:
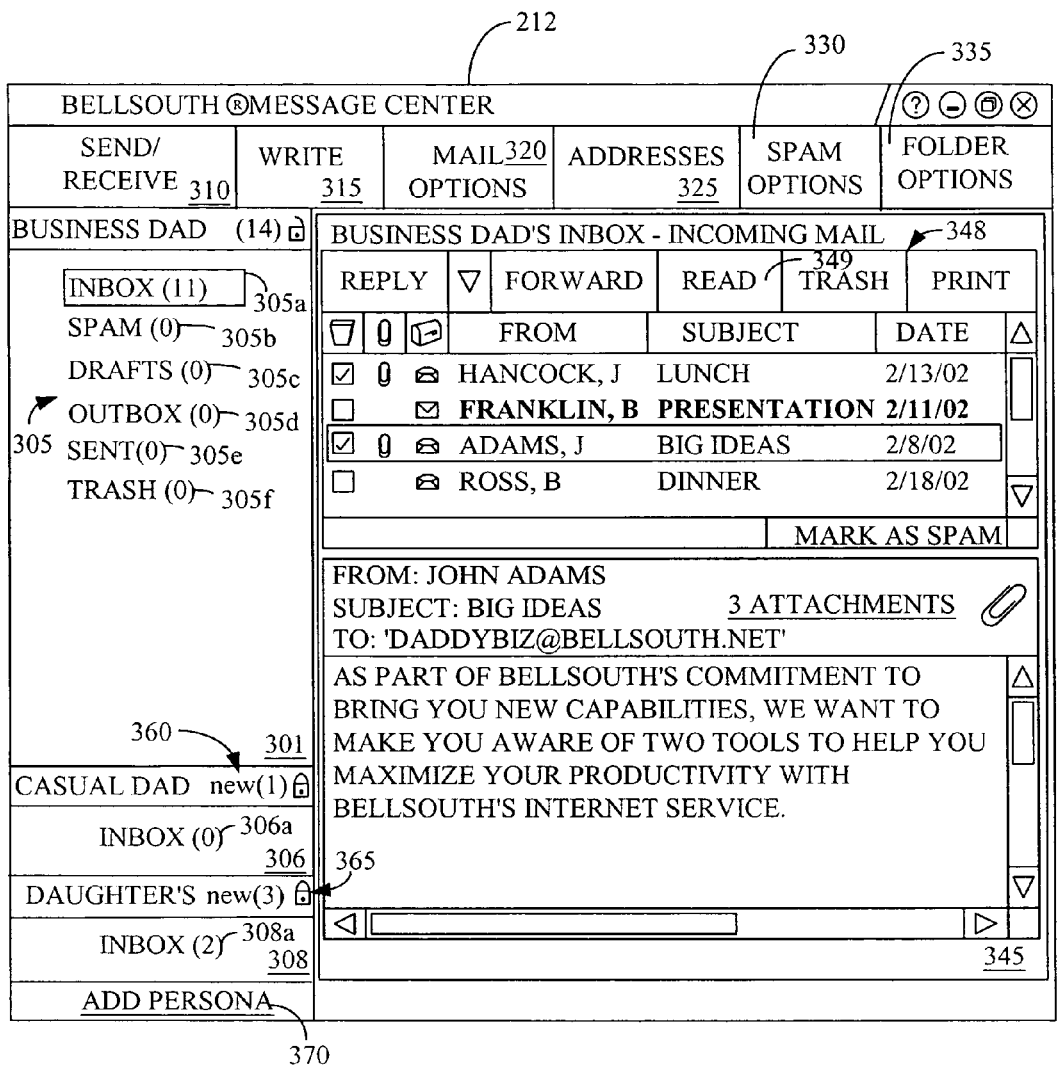
FIG. 3 is a diagram of one embodiment of the email user interface of FIG. 2.

FIG. 3 is a diagram showing one embodiment of a user interface for the message center 212 of FIG. 2 in greater detail. As shown in FIG. 3, the message center 212 of the email user interface comprises a send or receive selection button 310, a write selection button 315, a mail options selection button 320, an address book database selection button 325, a spam options selection button 330, and a folder options selection button 335. If a user selects the address book database selection button 325, then an address book user interface (not shown) is launched or instantiated as is commonly understood in the art. If the user selects the write selection button 315, then a compose window 208 is launched or instantiated as is commonly understood in the art. Similarly, if the user selects the send or receive selection button 310, then any prepared messages are sent and the designated mail servers for the active persona are checked for new mail. As known to those skilled in the art, there are many different ways to facilitate reading and writing a message, and the disclosure presented herein should not be limited to a particular method for displaying the text of a message or for composing a message.

Further, if a user assumes a persona (e.g., by utilizing a communications account associated with the persona or by logging into the persona) and selects the folder options selection button 335, the user may configure and store unique folder options specifically for that persona. Accordingly, if the same user or another user assumes a different persona, then the user may configure different folder options for the different persona. In a similar manner, selection of the mail options selection button 320 may also provide customized mail settings (e.g., mail delivery rates, password protection) that may be customized according to different personas. The spam options selection button 330 may also allow different personas to have different levels of protection against undesired messages from email.

In addition to the selection buttons 310, 315, 320, 325, 330, 335 the message center 212 includes a display screen 345, which displays received email messages and displays a preview pane having a preview of a selected email message for the active persona. The display screen 345 also includes message response options 348 such as replying to the email, forwarding the email, reading the full email (rather than merely previewing the email in the preview pane), deleting the email, or printing the email. For example, if the user selects the read selection button 349, then a read window 215 is launched or instantiated as is commonly understood in the art.

Also, the message center 212 is organized into separate display areas according to personas. The large display area 301 includes a folder or directory list having a plurality of folders 305 which have various email messages. The folder list is organized according to settings that may be customized for each persona (or suite). Thus, for example, the folder area may be organized into sub-folders such as, for example, inbox sub-folder 305a, spam items sub-folders 305b, drafts sub-folders 305c, pending items or outbox sub-folder 305d, sent sub-folder 305e, trash sub-folder 305f, etc. These folders in the large display 301 area are arranged according to settings in the active persona's profile. In an example embodiment, a user may organize the various folders and sub-folders according to the user's particular needs or desires (ie. the user's preferences) with respect to a persona of the user.

In the small display areas 306, 308, the inbox folder 306a, 308a is displayed for each non-active persona. Within this small display area 306, 308, the number of new messages that have been received may be indicated as shown by pointer 360. Also, the number of unread messages may be viewed. Further, a lock icon may be presented if access to the mail services for the persona is password protected, as shown by pointer 365. Therefore, if a profile of a persona specifies that the persona should be password protected, then the user interface will detect that a particular persona has been "locked" and request a password from the user before services associated with the persona may be accessed. The password received from the user will be checked with the password contained in the profile of the persona that is trying to be accessed. If the password is verified for that persona, then the services associated with the persona may be accessed.

For inactive personas, small display areas 306, 308 are provided to show a limited amount of information in regard to each inactive persona. However, once an inactive persona becomes active, the newly active persona takes control of the large display area 305 and the large display area is organized according to settings and preferences within the profile of the newly active persona. The prior active persona becomes inactive and is associated with a small display area 306, 308. Note, the number of small display areas 306, 308 within the message center 212 depends on the number of inactive personas that have been created.

Since the organization and display of folders is well known in the art, further discussion of organization and display of folders is omitted here. However, it is worthwhile to note that, unlike prior systems, the message center 212 of FIG. 3 permits a user to view a listing of all of the user's email messages associated with a particular persona from all of the user's email accounts (associated with the particular persona) at a single central location. Thus, the message center 312 removes the inconvenience of manually accessing multiple email accounts to retrieve all of the user's email messages that may be commonly related in a user-defined manner.

As described with reference to FIGS. 1 and 2, upon receiving a selection of a component or object within the email user interface 210 that is associated with a particular profile, the email user interface 210 notifies the tray manager 102 that the particular persona is now currently active. Specifically, the selected object or component is associated with a globally unique identifier (GUID) that is associated with a particular persona at the time of creation of the persona (or suite). Particularly, every piece of information related to a specific persona is correlated to a persona identifier or a globally unique identifier (GUID), thereby permitting a lookup of information based on the GUID. In an example embodiment, the GUID is a 128-bit number that is unique to that message. Since GUID generation is well known in the art, further discussion of GUID generation is omitted here.

With regard to FIG. 2, the tray manager 102 receives the GUID from the email user interface 210 and determines from a look up table which persona and therefore which service interface is associated with the GUID. The tray manager 102 notifies the appropriate service interface layer 103a-103c that it is now active and passes a pointer to the email user interface 210 so that the service interface layer 103a-103c and the email user interface 210 may communicate directly with each other. Correspondingly, the tray manager 102 "deactivates" all other service interface layers 103a-103c by notifying each that they are now inactive. Accordingly, the service interface layers that are deactivated send commands to any IM user agents 104a-104c that are running to set the presence state for their persona to an inactive state, such as "online-away." Likewise, the active service interface layer 103a-103c sends the appropriate command to the IM user agent to indicate that the presence state of its persona is "online-available." In some embodiments, after a service interface layer is activated or deactivated, the service interface layer immediately directs an IM user interface to update the presence state of the persona associated with the service interface layer.

Integration of email and IM may be achieved by having a service interface layer 103a-103c that is accessible through a tray manager 102 to both the various IM components and various email components to indicate the current presence statuses of active and inactive personas. Accordingly, the presence state of the particular persona may be available to other individuals who monitor the presence of the particular persona. Therefore, a persona that is currently active on the personal computer (or other computing or communications device) should have a presence state indicating its online availability while a persona that is not currently active should have a presence state such as "online-away."

FIG. 4 is a block diagram showing one embodiment of component architecture related to IM services when the user selects the IM user interface 408. As described previously, the tray manager 102 may query the user for a selection of the IM 408 or email user interface 210. If the user selects the IM user interface 408, then the tray manager 102 instantiates the IM user interface 408, which queries the user for the user's IM login name and password which may be associated with a persona.

The IM user agent 104a-104c receives the login name and password and looks up the login database (not shown) to determine whether or not the login name and password are valid (i.e., whether or not the login name and password are located in the login database). If the login name and password are valid, then the IM user agent 104a-104c retrieves login names and passwords for all of the IM accounts associated with respective persona. For example, during initial creation of the persona (or at a time thereafter) various instant messaging accounts and related information may be associated with a particular persona.

Upon retrieving the login names and passwords of all of the persona's IM accounts from the login database, the IM user agent 104a-104c may log into each of the persona's IM accounts through an IM abstraction server 404a-404c using the respective login names and passwords for each of the persona's IM accounts. The logging into various IM accounts, such as through an IM abstraction server, for example, is described in detail in U.S. provisional patent application Ser. Nos. 60/411,336 and 60/419,613, and U.S. patent application Ser. Nos. 10/274,408, 10/274,478, and 10/274,405, which are incorporated herein by reference as if set forth in their entireties. Thus, further discussion of logging into various IM accounts, such as through the IM abstraction server 404a-404c, is omitted here.

Accordingly, when a persona is active on the personal computer, the IM user agent 104a-104c for the persona is activated so that the presence information for the related instant messaging accounts indicates that the user or persona is "online-available." In turn, when a different persona subsequently becomes active on the personal computer, the IM user agent of the previous persona is deactivated. Accordingly, the IM user agent of the previous persona will update its presence information to "online-away" while the IM user agent of the currently active persona will update its presence information to "online-available." Likewise, the other communication services for the current and prior personas are activated and deactivated respectively.

With regard to FIG. 4, the tray manager 102 receives the GUID of the active persona from the IM user interface 408 and determines from a look up table which persona and therefore which service interface is associated with the GUID. The tray manager 102 notifies the appropriate service interface layer 103a-103c that it is now active and passes a pointer to the IM user interface 408 so that the service interface layer 103a-103c and the IM user interface 408 may communicate directly with each other.

Information regarding a user's persona (or suite) is typically saved by a user interface in an XML-structured data file for that persona and is stored locally. XML provides a versatile approach that is compatible with almost any other Internet-based technology. In short, XML is a markup language for documents containing structured information, which contains both content (e.g., words, pictures, etc.) and some indication of what role that content plays (e.g., content in a section heading has a different meaning from content in a footnote, which means something different than content in a figure caption or content in a database table, etc.). The XML specification titled "Extensible Markup Language (XML) 1.0 (Second Edition), W3C Recommendation 6 Oct. 2000" (referred to herein as "the XML specification") by W3C is hereby incorporated by reference as if set forth in its entirety.

Figure 5:
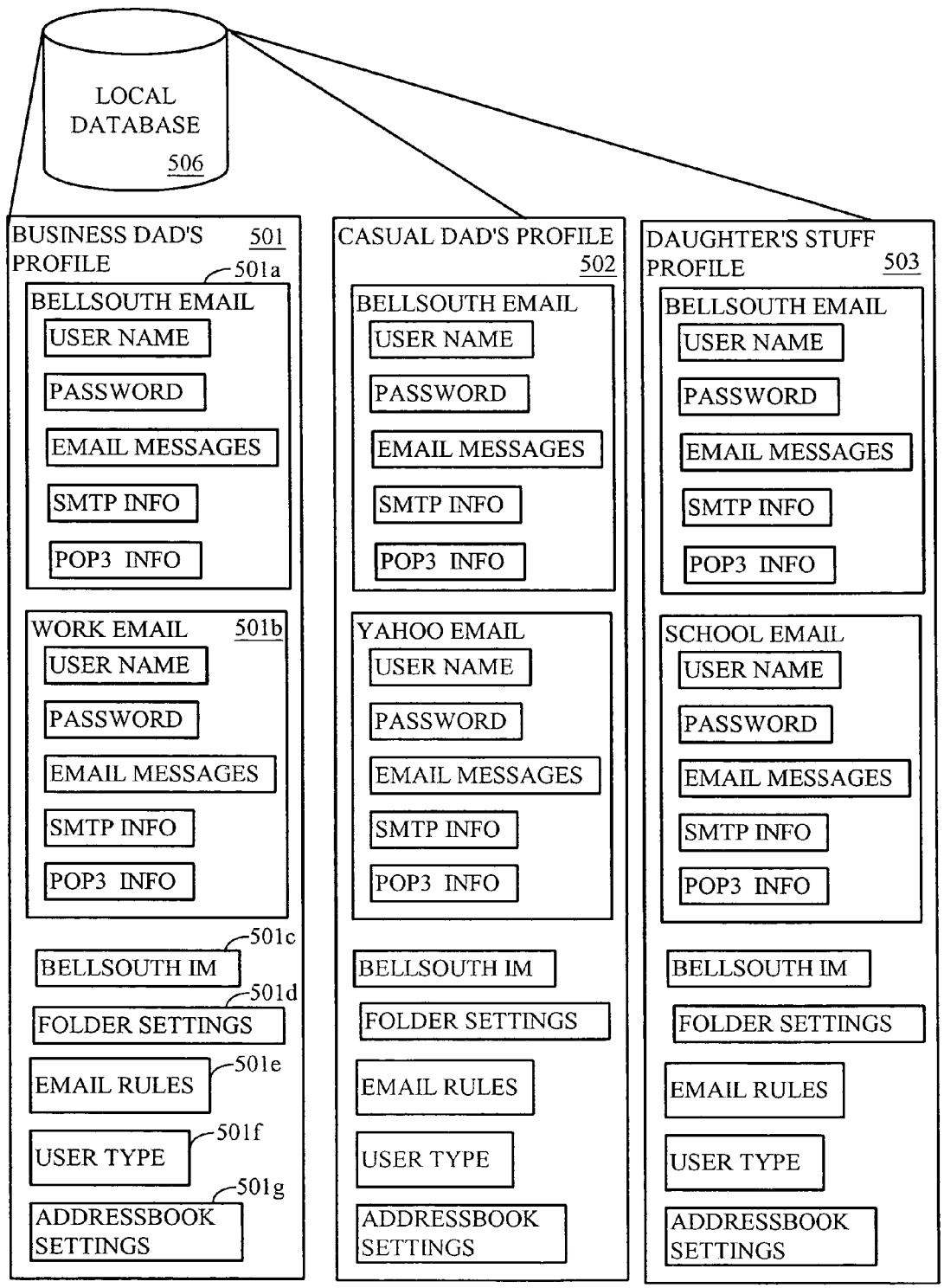
FIG. 5 is a block diagram of one embodiment of the organization of data structures utilized in the component architecture of FIG. 1.

FIG. 5 is a diagram showing one embodiment of the organization of data structures in a local database 506. In some embodiments, the local database 506 has XML profiles for each of the email personas. Such profiles include a collection of settings for each of the persona's email accounts. Profiles may also include a collection of settings for each of the persona's other communication services, such as instant messaging (IM) accounts. Consider, an email service utilized by two users: Dad and Daughter. Dad has created two personas for himself: Business Dad and Casual Dad. However, Dad has only created one persona for his daughter: Daughter's Stuff. Therefore, the profiles of personas for Dad and Daughter may appear as in FIG. 5.

Thus, for example, given three personas, Business Dad, Casual Dad, and Daughter's Stuff, the data structure in the local database 506 will include Business Dad's profile 501, Casual Dad's profile 502, and Daughter's Stuff's profile 503. Business Dad's profile 501 may include a listing of all of the email accounts 501a, 501b associated with the Business Dad persona as well as all of IM accounts 501c associated with the Business Dad persona. For each account, user name, password, SMTP server information, and POP3 (or IMAP, among others) server information may be given. Further, folder settings 501d, email rules 501e, user type 501f, and address book settings 501g may also be included. The email rules 501e may specify the procedure for sorting, forwarding, deleting messages (such as spam). The user type 501f may designate a persona type or class such as whether or not a user of a persona is an administrator, a guest, or a user having limited privileges and access.

While examples of information related to a persona are listed above, it should be appreciated that the persona profiles 501, 502, 503 may include any information related to a particular persona. Hence, if Dad (as administrator) or Daughter further defines properties or preferences associated with Daughter's email account, then persona 503 of Daughter's Stuff may include those email properties or preferences defined by Dad or Daughter. For example, the profile for Daughter's Stuff may have features that are not included in the profile of Casual Dad. For instance, the profile for Daughter's Stuff may have activated spam filtering and text filtering for all the messages that are addressed to an email account in the profile of Daughter's Stuff. However, the profile of Casual Dad may not have activated these features.

For example, each persona may specify the rate of message retrieval of email messages from a POP3 server. In other words, a first persona could retrieve messages every 15 minutes, while a second persona could retrieve messages every hour. Alternatively, messages may be set to only be retrieved upon a user's manual command or to be retrieved automatically by the user's email service.

Upon retrieving new messages, an active service interface layer may command a user interface to display a notification to an active persona that a new message has been received. Correspondingly, if a new message has been received for an inactive persona, the active service interface layer for the inactive persona may suppress displaying a notification or some types of notifications until the inactive persona becomes active. One skilled in the art will recognize that the notification is typically in the form of a message icon appearing in the tray, or some form of aural notification.

In some alternative embodiments, among others, of the present disclosure, certain types of notifications may be preferred to be displayed for non-active personas when correspondence is received for the non-active personas. For example, in FIG. 3 there is a new message icon 360 next to the representation of the mailbox labeled "Casual Dad," although "Casual Dad" is not the active persona. Thus, a user who may not be currently using the "Casual Dad" persona will not have to open the message or inbox of "Casual Dad" to know to that "Casual Dad" has new correspondence. Moreover, the message will automatically be placed in the correct mailbox (according to persona designation) such that users not associated with the mailbox will not have to sort the incoming email. Note, aural notification may be prevented for non-active personas.

Further, the email user interface 210 may include general preferences or settings that apply generally to all of the personas that may be configured by the administrator of the email service. For example, the type of email connection that the personal computer is using (e.g., dial up connection, digital subscriber line, cable modem, etc.) to receive email service may be specified as a general option and therefore applies to each persona that has been created. It should be recognized by one skilled in the art that there are a plethora of Internet connection types, including a digital subscriber line (DSL) service, an integrated services digital network (ISDN) service, an analog dial-up service, ethernet, T-1, cable, powerline or any other service for transmitting data through a network.

Referring again to FIG. 3, embodiments for creating personas are now described. As shown in FIG. 3, the user interface 212 comprises an add persona selection button 370 which permits the user to add a new persona to the organizational structure of the email service. Thus, in operation, if a user selects the new persona selection button 370, the email user interface 210 issues a request to the email user agent 206a-206c to launch or instantiate a user interface for adding new persona information. Visually, the addition of the new persona may be represented by the addition of a mailbox to the message center 212, as one example, among others.

Figure 6:
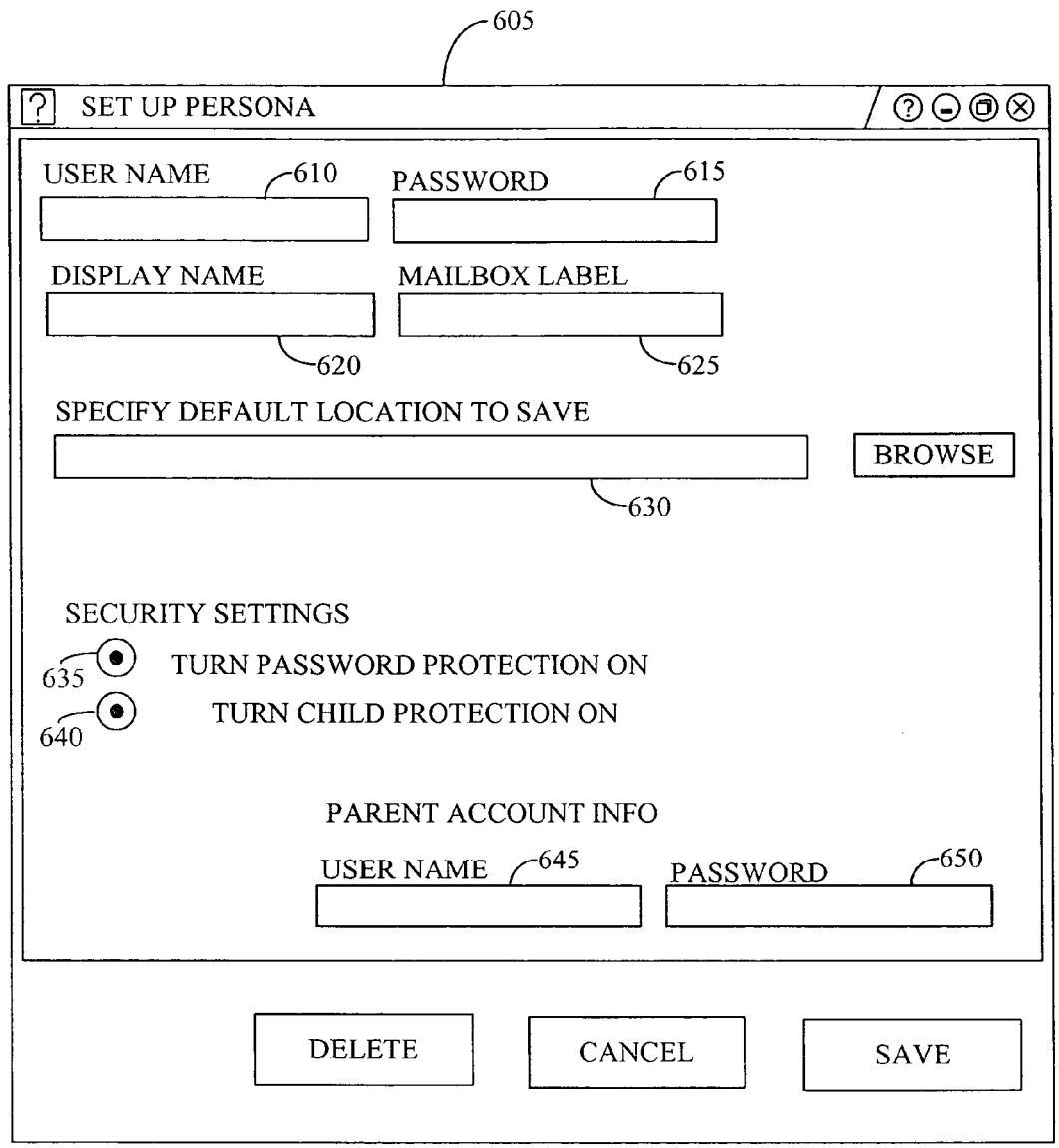
FIG. 6 is a diagram of one embodiment for adding new persona information within the component architecture of FIG. 2.

FIG. 6 is a diagram showing one embodiment of a user interface 605 for adding new persona information. As shown in FIG. 6, the user interface 605 comprises a username input box 610 and a password input box 615, which permits a user to input the username and password associated with an email account. In addition to the username input box 610 and password input box 615, the user interface 605 comprises a display name input box 620 which permits the user to input the name that will be displayed on email messages (next to the "From" field) that are sent by the user for this particular mailbox or persona. Further, the user interface 605 comprises a mailbox label input box 625 that permits the user to provide the name that will be displayed as the name for the persona on the message center display. The user interface 605 further comprises a default location to save input box 630, which permits the user to designate a file directory location to save attachments that are contained within received messages. The user interface 605 further comprises a password protection selection button 635 to enable a user to activate password protection to prevent unauthorized access to services associated with the persona. For example, if password protection is activated, a user may have to enter the correct email account password associated with a particular persona before the user is allowed to access an inbox or other folders associated with the particular persona.

The user interface 605 may further comprise a radio-style or check-box style selection button 640 to indicate that the particular persona (or suite) is of a special type or class. In this case, a child protection selection button 640 is provided to indicate that the persona is of type "child." Accordingly, by turning child protection on, a user of this persona may be prevented from or require authorization before certain folders are accessed and/or certain operations are performed. For example, if the child protection 640 has been turned on, then the username and password of another ("master" or "parent") account or persona may be specified (e.g., account information of a parent) in a provided username and password input boxes 645, 650. Therefore, to access a child's spam folder (that contains unsolicited and/or unauthorized mail that has been detected by the user's email service) or to change user settings, a user of that persona may have to enter the password of the master or parent account associated with that persona. If the child protection has been turned on, password protection may also be provided for the "child" type persona. However, either the password for the "child's" account or the password for the "parent" account may provide access to information and features associated with the "child" persona. In this way, the user of the parent persona may access the "child" type persona with the parental password so that the user of the parent persona may monitor communications received by the "child" type persona. In alternative embodiments of the disclosure, as part of child protection services, a persona of a child type may not be provided with a spam folder. Accordingly, within the mail store 206, any messages that are intended for a communications account of a persona of type child that are determined to be spam may be redirected to a spam folder of the associated parent persona within the mail store 206.

Figure 7:
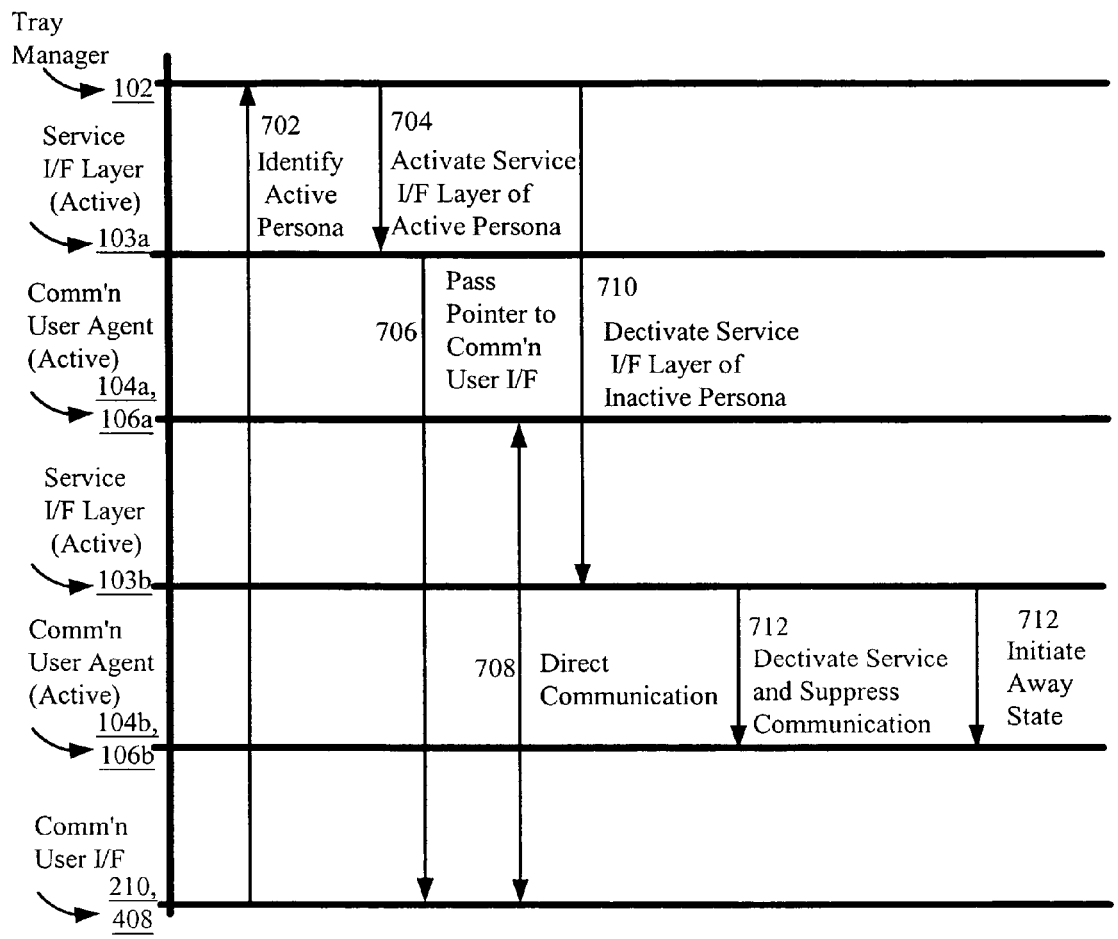
FIG. 7 is a data flow diagram corresponding to the component architectures of FIG. 2 and FIG. 4.

FIG. 7 is a data flow diagram corresponding to FIGS. 1 through 6. In this regard, FIG. 7 shows the data flow subsequent to the tray manager receiving a selection of a communication user interface 210, 408 (e.g, IM, email, ICW, etc.) by the user. Upon receiving the selection of the communication user interface 210, 408 the communication user interface notifies (702) the tray manager 102 as to which persona (or suite) is active within the communications user interface 210, 408. The communications user interface 210, 408 determines that a first persona is active. Upon receiving the notification from the communications user interface 210, 408, the tray manager 102 notifies (704) the service interface layer 103a-103c associated with the first persona that it is active. Accordingly, the tray interface manager 102 passes (706) the pointer to the communications user interface 210, 408 to the service interface layer 103a-103c of the first persona so that the communications user interface 210, 408 and the communications user agent of the first persona 104a-104c, 106a-106c may communicate directly (708). Accordingly, any communication that is received or has been received or needs to be transmitted by the communications user agent may be delivered (708) to the communication user interface 210, 408 and is not suppressed while the associated persona is active. However, for the other service interface layers 103a-103c not associated with an active persona, the tray manager 102 notifies (710) the service interface layer(s) 103a-103c that they have been deactivated. Accordingly, a service interface layer 103a-103c of a second persona that is inactive may suppress (712) communication with the communication user interface 210, 408 until the service interface layer of the second persona is activated. Also, the service interface layer 103a-103c of the second persona may direct (714) the communications user agent 104a-104c, 106a-106c to go into an away state. For example, an IM user agent 104a-104c may be directed to change the presence state of the second persona to online-away. Further, an EM user agent 106a-106c may direct the email services of the second persona to go into a "sleep mode" state of service.

The service interface layer 103a-103c, the email user agent 106a-106c, the IM user agent 104a-104c, the tray manager 102, and other objects instantiated by these components may be implemented in hardware, software, firmware, or a combination thereof. In some embodiment(s), the service interface layer(s) 103 a-103c, the email user agent(s) 106a-106c, the IM user agent(s) 104(a)-104(c), the tray manager 102, and other objects instantiated by these components is implemented in software or firmware that is stored in a memory and that is executed by a suitable instruction execution system. If implemented in hardware, as in alternative embodiments, the service interface layer(s) 103(a)-103(c), the email user agent(s) 106(a)-106(c), the IM user agent(s) 104(a)-104(c), the tray manager 102, and other objects instantiated by these components can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 8:
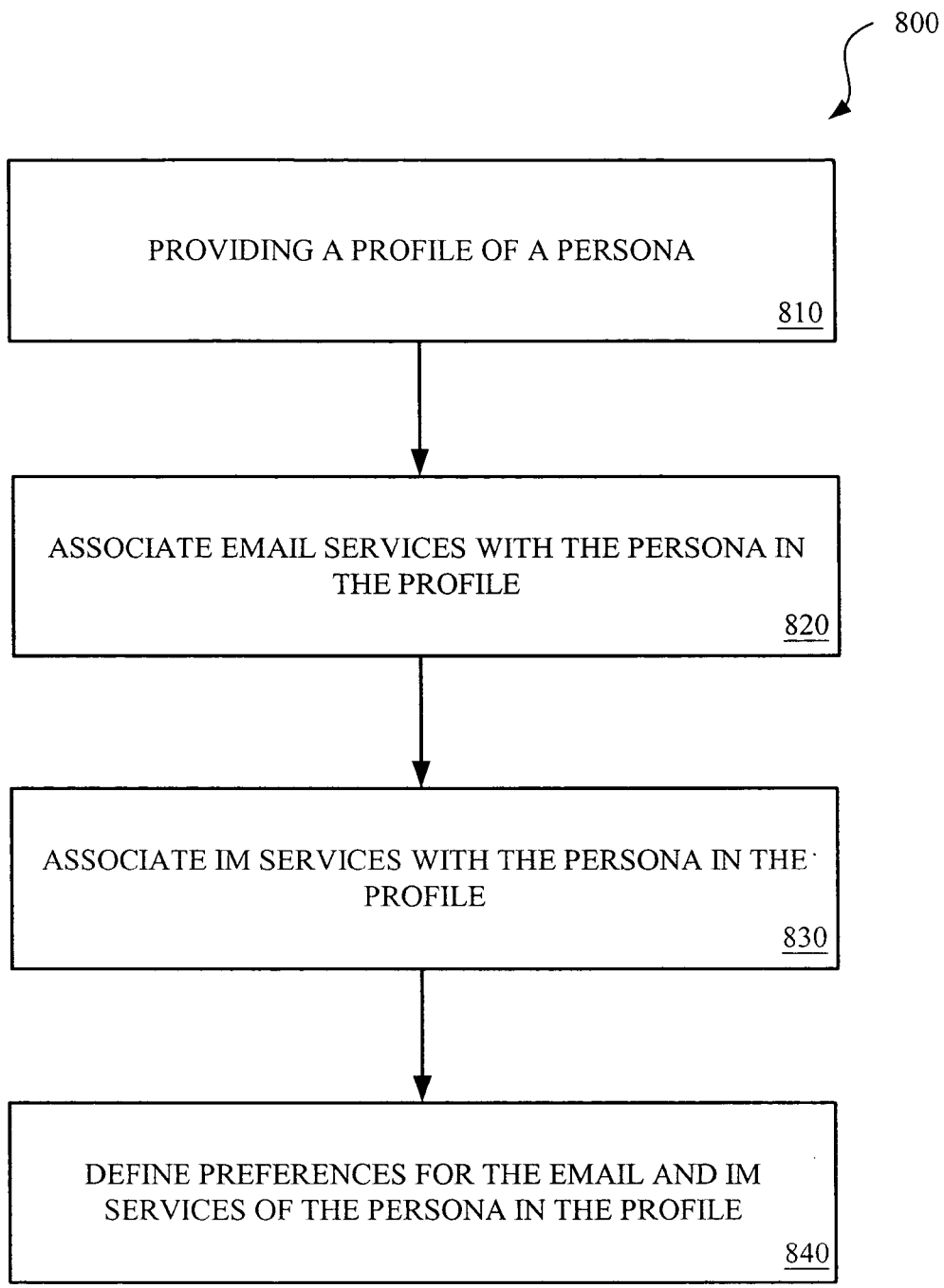
FIG. 8 is a flowchart describing functionality for managing multiple communication personas for one embodiment of FIG. 1.

Having described several embodiments of systems for creating and managing communication personas, attention is turned to FIGS. 8-11 which show several embodiments of methods for managing multiple communication personas. FIG. 8 is a flowchart showing an embodiment of a method for managing multiple communication personas on a computing device. As discussed previously, a user of computer or personal communications device may employ various communication services over various communication channels (e.g., email addresses, IM addresses, telephone numbers, etc.) and these services/channels may be associated with one or more personas created by the user. A profile of a persona (or suite) may be used to define properties associated with the persona's communication accounts, such as email, IM, Internet call waiting (ICW), videoconferencing accounts, among others. In this regard, one embodiment of the process (800) may be seen as comprising the steps of providing (810) a persona profile, which includes a collection of properties or preferences for communication services, such as email and IM accounts. The persona profile is associated (820) with the persona's email services and, also, associated (830) with the persona's IM services. Properties or preferences of the persona's email services are then defined (840) using the persona's profile. Similarly, properties or preferences of the persona's IM services are also defined (850) using the persona's profile. In this regard, the persona profile may be used to define the properties or preference of all of the persona's digital communications media.

Figure 9:
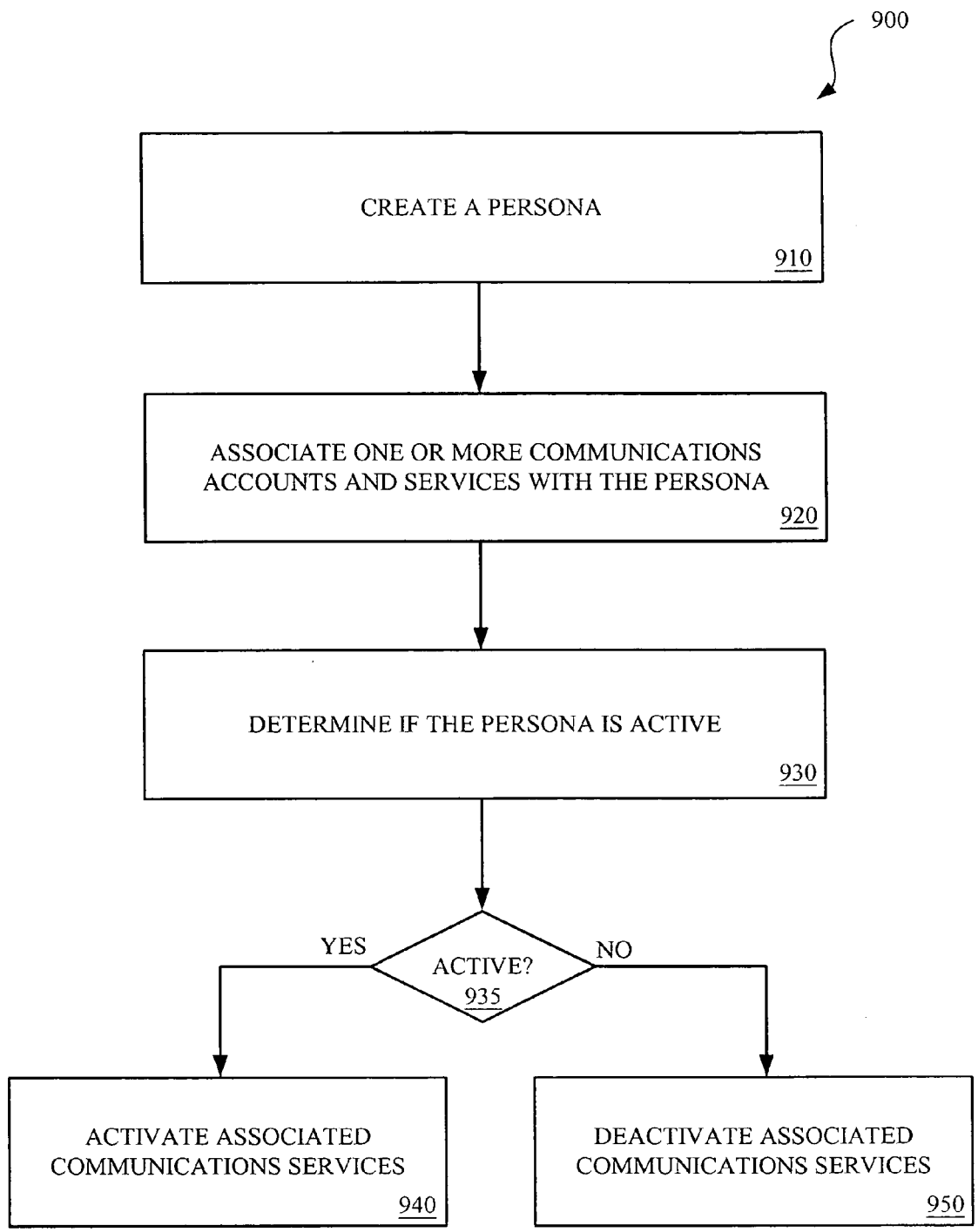
FIG. 9 is a flowchart describing functionality for managing and integrating communication services for one embodiment of FIG. 1.

FIG. 9 is a flowchart showing yet another embodiment of a method for managing and integrating communication services with one or more personas. In this embodiment, the process (900) comprises the step of creating (910) a persona (or suite) and associating (920) one or more communication accounts (and thus services or communication channels) with that persona on the computing device. Hence, for example, a user may create the persona of "Club Activities" and associate the user's email accounts that are used with regard to user's skydiving club, chess club, and running club with the "Club Activities" persona. Further, the user may associate the IM account that the user utilizes to chat with other members of the clubs with the persona. Next, the process (900) further comprises the steps of determining (930) if the persona is active or inactive on the computing device. If the persona is active, then the associated communication services of the persona are activated (935 & 940). For example, if the user has assumed the "Club Activities" persona to check the user's club email accounts, then the user's IM account will also show that the user is available to chat with other club members. However, if the persona is inactive, then the associated communication services of the persona are deactivated (935 & 950). For example, if a different user is operating an IM chat session associated with a different persona, then the email services associated with the "Club Activities" persona may operate in a "sleep mode" state of service.

Figure 10:
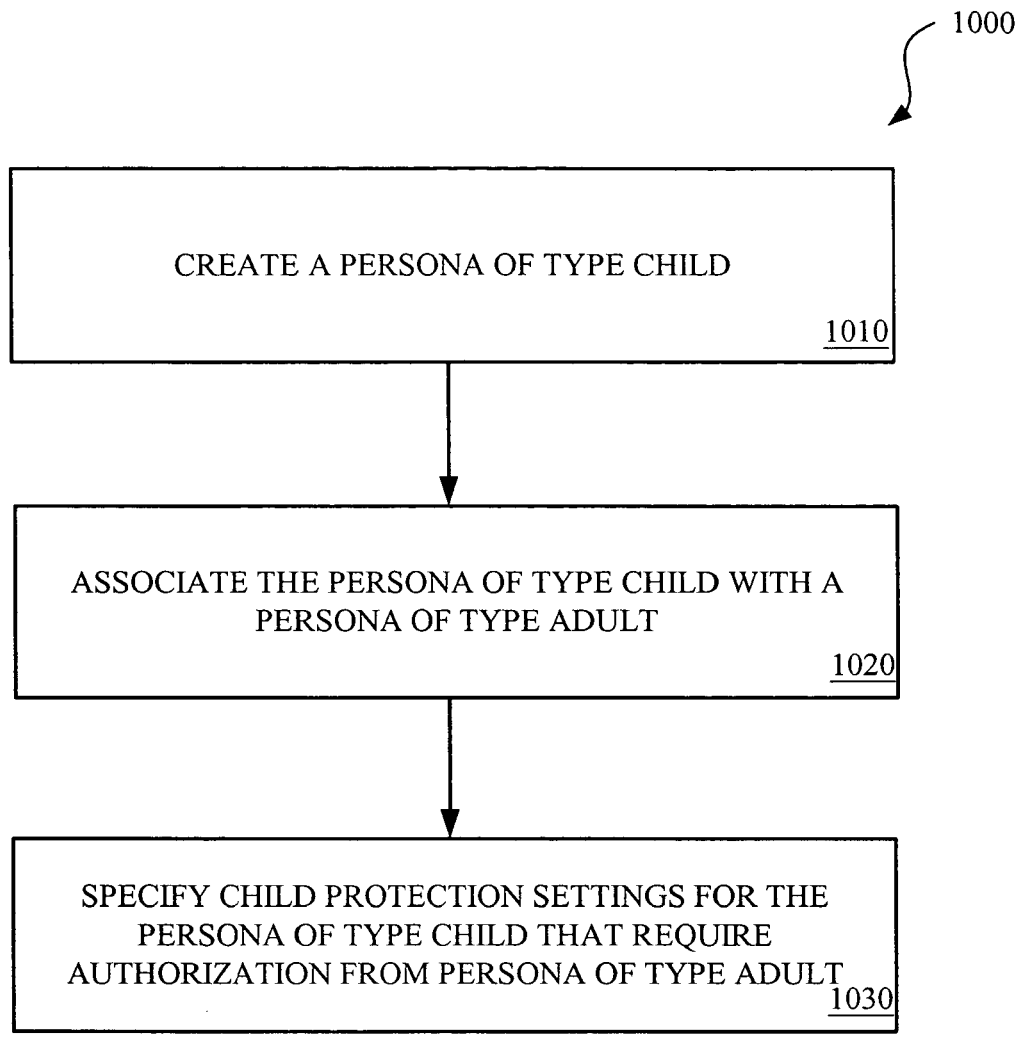
FIG. 10 is a flowchart describing functionality for providing child protection services with one embodiment of FIG. 2.

FIG. 10 is a flowchart showing an embodiment of a method for providing child protection with email services based on persona management. In this embodiment, the process (1000) comprises the step of creating a persona (that is associated with communication services and channels) and classifying the persona as a "child" type. Next, another persona that is not of a child type is associated (1010) with the persona of type "child." This non-child type may be referred to as an "adult" type. Further, settings for child protection are specified (1020) in order to limit forms of communications received by and operations performed by the persona of the child type, unless authorized by the persona of the adult type.

For example, a persona of a child type may be prevented from configuring or changing settings with regard to email services, unless authorized by the persona that is of the adult type. Therefore, a user of the persona of the child type may have to enter the password contained in the associated persona of the adult type. Accordingly, a persona of type "child" may be prevented from accessing certain folders, unless authorized by the persona of the adult type. Further, certain messages intended for a persona of the child type may be redirected to be received by the persona of the adult type. For example, email messages that are detected to obtain objectionable language by the email service for the persona of the child type may be directed to a folder of the associated persona of the adult type so that a user of the persona of the adult type may monitor the content of such messages.

Figure 11:
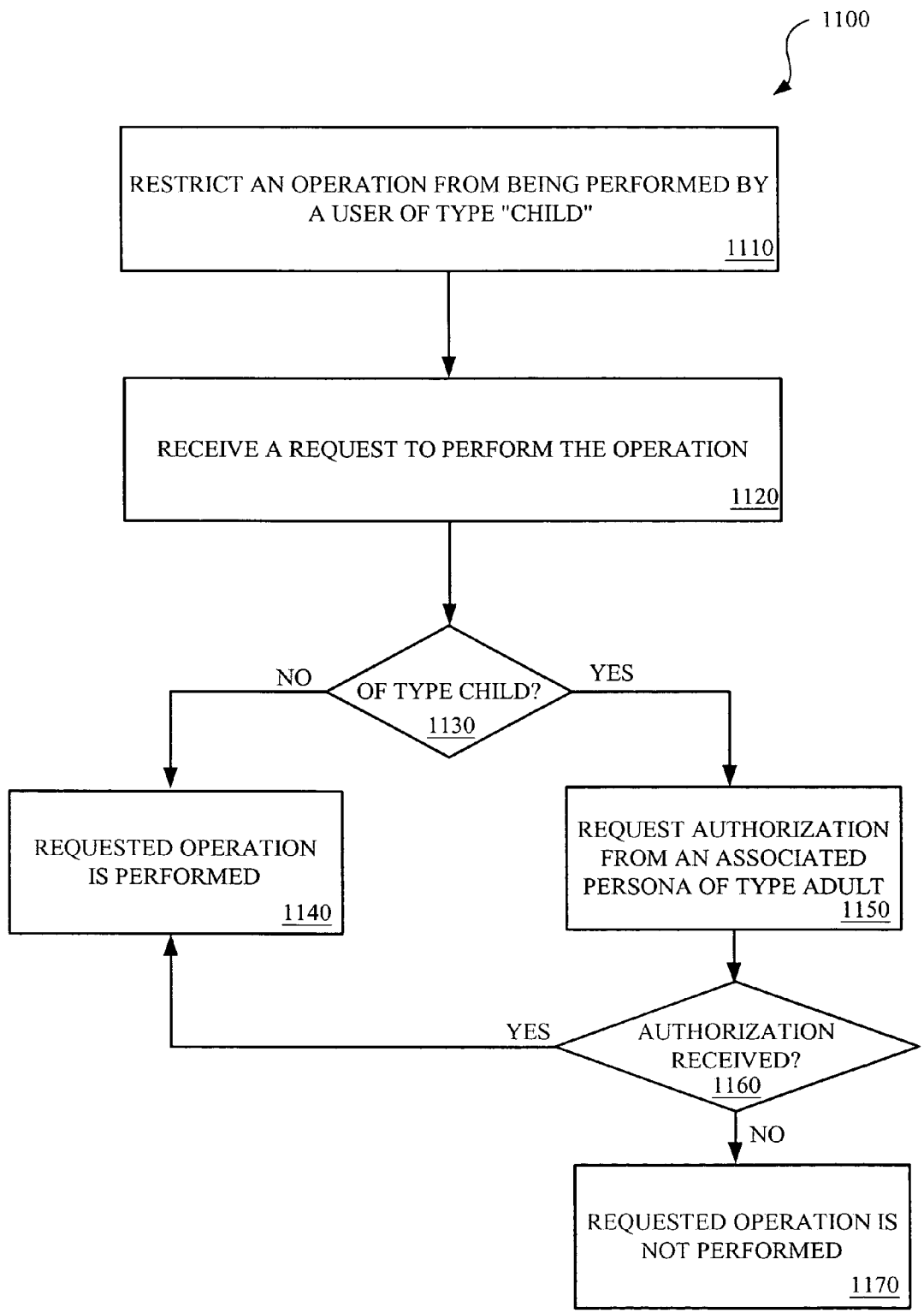
FIG. 11 is a flowchart describing functionality for child protection based on persona management according to the present disclosure.

FIG. 11 is a flowchart showing another embodiment of a method for providing child protection with email services based on persona management. In this embodiment, the process (1100) comprises the step of restricting (1110) an operation from being performed within a user interface by a user of type child. Next, a user who has assumed a persona requests (1120) to perform the operation. Then, user interface logic determines (1130) whether the persona of the user is of type child. For example, the profile of the persona may have an XML tag indicating the type of persona. Therefore, user interface logic may examine the appropriate XML data to determine the type of persona of the user.

If the user is not of type child, then the user interface logic performs (1140) the requested operation. However, if the user is of type child, user interface logic requests (1150) authorization from a persona of type adult that is associated with the persona of type child. If authorization is received, then user logic performs (1160 & 1140) the requested operation. Otherwise, if the authorization is not received, then the user interface logic prohibits (1140 & 1170) the operation from being performed. Note, it will be understood by those skilled in the art that other types of personas may be created and therefore, certain operations may be restricted for one type of persona and not another.

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

The service interface layer 103a-103c, the email user agent 106, the IM user agent 104, the tray manager 102, and other objects instantiated by these components may be implemented as a computer program, which comprises an ordered listing of executable instructions for implementing logical functions. As such the service interface layer 103a-103c, the email user agent 106, the IM user agent 104, the tray manager 102, and other objects instantiated by these components can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium.

More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured via, for instance, optical scanning of the paper or other medium, then compiled, interpreted or otherwise processed in a suitable manner if necessary, and then stored in a computer memory.

Although exemplary embodiments have been shown and described, it will be clear to those of ordinary skill in the art that a number of changes, modifications, or alterations, as described, may be made. For example, while the disclosed embodiments show the various modules (e.g., service interface layer 103a-103c, the email user agent 106a-106c, the IM user agent 104a-104c, the tray manager 102, other objects instantiated by these components, etc.) as being in a distributed network, it will be clear to one of ordinary skill in the art that the various modules may be located on a server or a client without adverse effect to the functioning of the various components. All such changes, modifications, and alterations should therefore be seen as within the scope of the disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles herein. All such modifications and variations are intended to be included herein within the scope of this disclosure.

The invention claimed is:

1. A communication system comprising:
a user interface application for an email service, the user interface application residing on a computer;
a communication manager configured to:
track user activity; and
regulate a level of communications that occurs for an active user based upon a designation of the active user as either an adult or a child, the communication manager residing on the computer, wherein:
the user interface application provides an identity of the active user to the communication manager such that a user interface is arranged according to settings for the active user such that a user having a child persona designation is restricted from configuring email accounts accessed by the communication manager for the active user having the child persona designation and a subset of operations performed by the communication manager unless authorized by a user having an adult persona designation,
wherein the user interface to the email service displays a folder list of message folders for a local message store when the active user has an adult type of persona, the folder list comprising folders holding messages addressed to the active user having the adult type of persona and folders holding messages addressed to non-active user having a child type of persona that is being monitored by the active user.

2. The communication system of claim 1, further comprising an instant messaging user interface application residing on the computer, wherein the instant messaging user interface application provides the identity of the active user of an instant messaging service to the communication manager such that the instant messaging user interface is arranged in accordance with settings for the active user, wherein the active user is designated as having either a child or an adult type of persona such that a user having a child persona designation is prohibited from configuring types of instant messaging communications received by and operations performed by the communication system unless authorized by another user of an adult type.

3. The communication system of claim 1, wherein the communication manager determines the messages addressed to the non-active user having a child type persona to be undesirable for the non-active user.

4. The communication system of claim 1, wherein a persona of a child type has a plurality of email accounts that are to be checked for newly received mail when the persona is identified as belonging to an active user.

5. The communication system of claim 1, wherein the persona of a child type identifies a user of an adult type that is needed to authorize restricted operations requested to be performed by an active user having the persona of the child type.

6. The communication system of claim 5, wherein the communication manager requests authorization from a designated user having an adult persona designation to execute an operation that has been restricted to be performed by a user having a child persona designation when the operation is requested to be performed by an active user having a child persona designation.

7. A method for providing child protection in communication services comprising:
tracking user activity on a computer;
regulating a level of communications that occurs for an active user based upon a designation of the active user as either an adult or a child;
identifying the active user of the computer as either having a persona of a child type or an adult type designation;
arranging a user interface of the computer for an email service according to settings for the persona identified to be that of the active user; and
restricting a user having a child persona designation from configuring email accounts accessed by the computer for the active user having the child persona designation and performing a subset of operations associated with the user interface for the email service unless authorized by a user having an adult persona designation,
wherein the user interface to the email service displays a folder list of message folders for a local message store when the active user has an adult type of persona, the folder list comprising folders holding messages addressed to the active user having the adult type of persona and folders holding messages addressed to non-active user having a child type of persona that is being monitored by the active user.

8. The method of claim 7, further comprising:
arranging a user interface of the computer for an instant messaging service according to settings for the persona identified to be that of the active user; and
restricting a user having a child persona designation from configuring types of instant messaging communications received for the active user and operations performed for the active user unless authorized by another user of an adult type.

9. The method of claim 7, further comprising:
determining the messages addressed to the non-active user having a child type persona to be undesirable for the non-active user.

10. The method of claim 7, wherein a persona of a child type has a plurality of email accounts that are to be checked for newly received mail when the persona is identified as belonging to an active user.

11. The method of claim 7, wherein the persona of a child type identifies a user of an adult type that is needed to authorize restricted operations requested to be performed by an active user having the persona of the child type.

12. The method of claim 11, further comprising:
requesting authorization from a designated user having an adult persona designation to execute an operation that has been restricted to be performed by a user having an adult persona when the operation is requested to be performed by an active user having a child persona designation.

13. A computer readable method encoded with a computer program for providing child protection in communication services when executed by a computer processor, the program comprising:
tracking user activity on a computer;
regulating a level of communications that occurs for an active user based upon a designation of the active user as either an adult or a child;
identifying the active user of the computer as either having a persona of a child type or an adult type;
arranging a user interface of the computer for an email service according to settings for the persona identified to be that of the active user; and
restricting a user having a child persona designation from configuring email accounts accessed by the computer for the active user having the child persona designation and performing a subset of operations associated with the user interface for the email service unless authorized by a user having an adult persona designation,
wherein the user interface to the email service displays a folder list of message folders for a local message store when the active user has an adult type of persona designation, the folder list comprising folders holding messages addressed to the active user having the adult type of persona and folders holding messages addressed to non-active user having a child type of persona that is being monitored by the active user.

14. The computer readable medium of claim 13, the program further comprising:
arranging a user interface of the computer for an instant messaging service according to settings for the persona identified to be that of the active user; and
restricting a user having a child persona designation from configuring types of instant messaging communications received for the active user and operations performed for the active user unless authorized by another user of an adult type.

15. The computer readable medium of claim 13, the program further comprising:
determining the messages addressed to the non-active user having a child type persona designation to be undesirable for the non-active user.

16. The computer readable medium of claim 13, wherein a persona of a child type has a plurality of email accounts that are to be checked for newly received mail when the persona is identified as belonging to an active user.

17. The computer readable medium of claim 13, wherein the persona of a child type identifies a user of an adult type that is needed to authorize restricted operations requested to be performed by an active user having the persona of the child type designation.

18. The computer readable medium of claim 17, the program further comprising:
requesting authorization from a designated user having an adult persona designation to execute an operation that has been restricted to be performed by a user having an adult persona when the operation is requested to be performed by an active user having a child persona designation.

* * * * *